Figure 1:
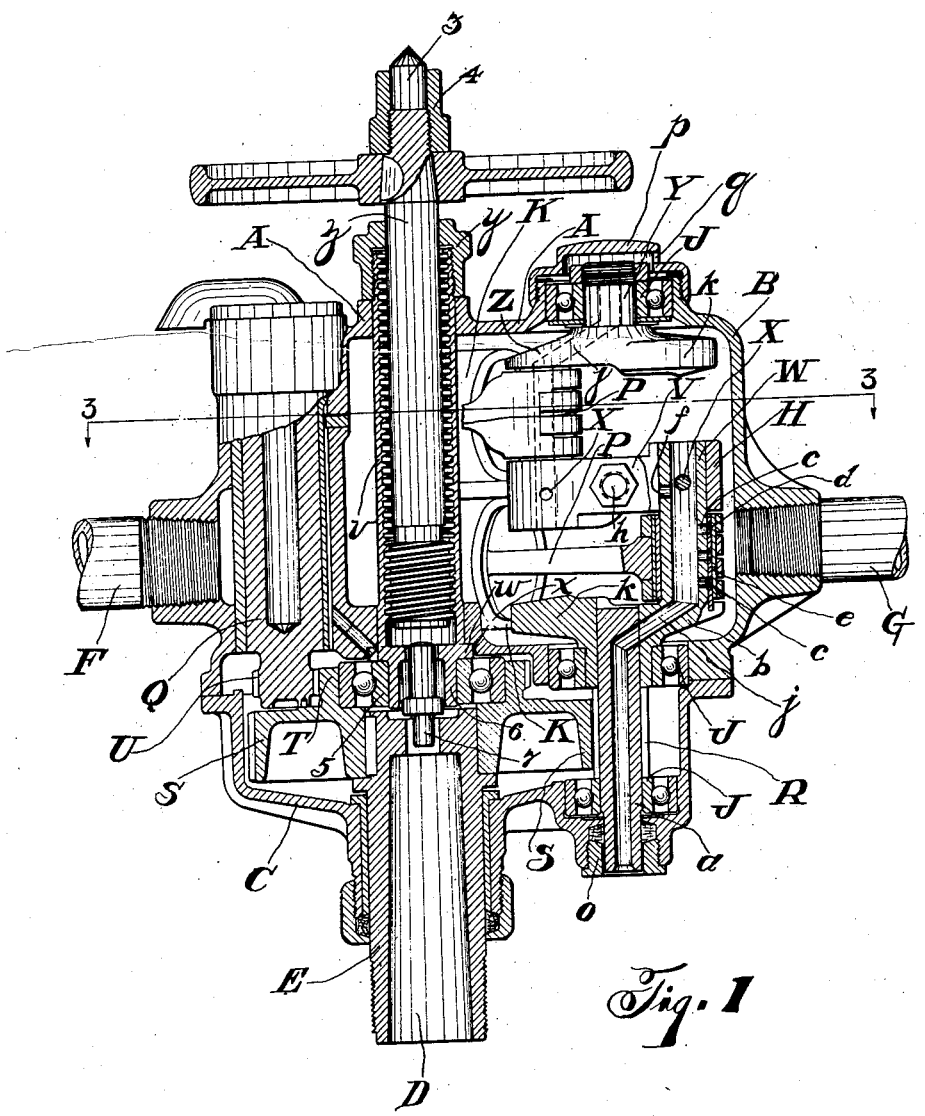

July 7, 1925.  
F. A. JIMERSON  
FLUID ACTUATED ROTARY TOOL  
Filed June 13, 1922

1,544,644

3 Sheets-Sheet 1

INVENTOR  
Francis A. Jimerson  
BY  
Herbert G. Ogden  
HIS ATTORNEY

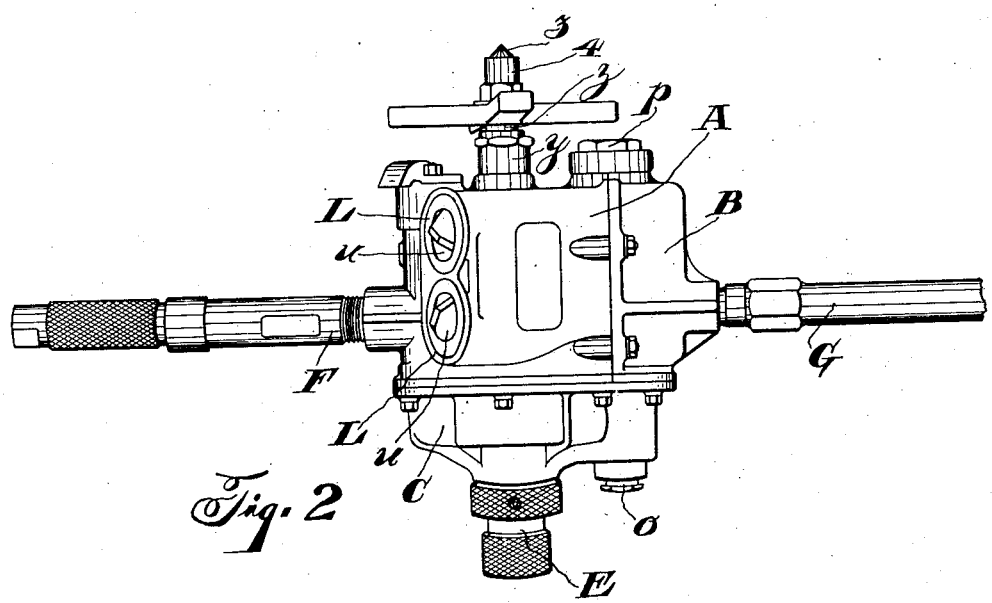
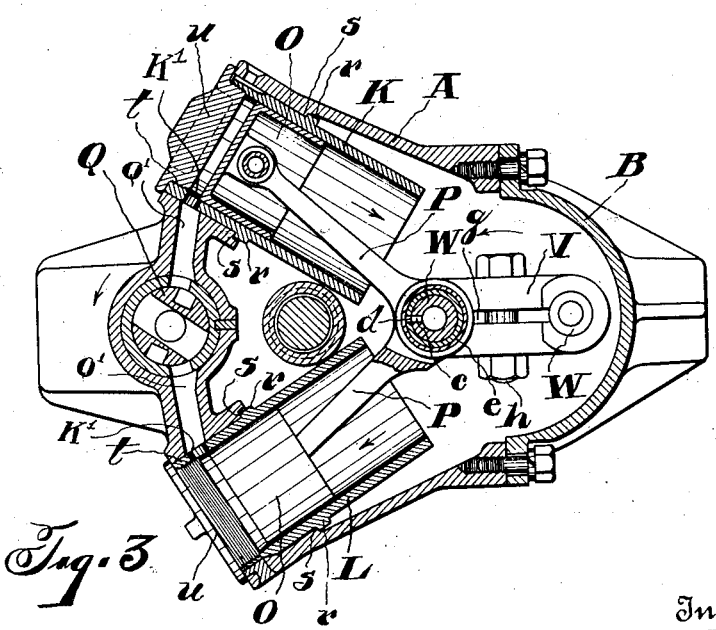

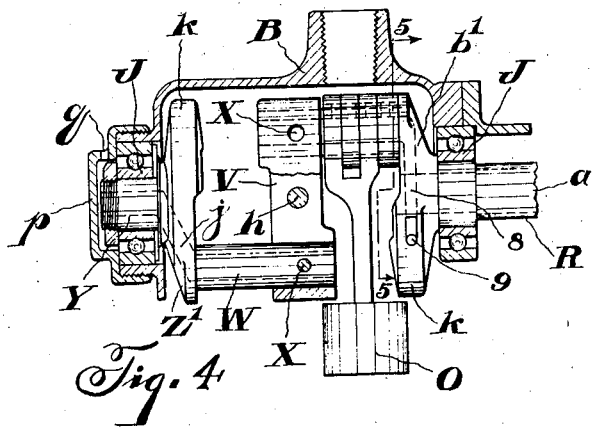

Patented July 7, 1925.

1,544,644

UNITED STATES PATENT OFFICE.

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

FLUID-ACTUATED ROTARY TOOL.

Application filed June 13, 1922. Serial No. 567,887.

*To all whom it may concern:*

Be it known that I, FRANCIS A. JIMERSON, a citizen of the United States, and a resident of Athens, county of Bradford, and State of Pennsylvania, have invented a certain Fluid-Actuated Rotary Tool, of which the following is a specification, accompanied by drawings.

This invention relates to fluid actuated rotary tools, such as drills for example, of the type adapted to be driven by a fluid actuated rotary motor. A pneumatic tool of this type may be used for drilling, reaming, tapping, flue rolling, wood boring, stud setting, bolt tightening, running down screw spikes, setting valves and for various other well known uses.

Such tools run at comparatively high speed and the objects of the present invention are to secure simple and efficient means for maintaining lubrication within the crank chamber and for distributing lubrication to the crank pin bearings and for keeping the crank pin bearings cool. Pneumatic tools of this type are customarily vented to the atmosphere to prevent pressure accumulating in the crank and gear chambers due to leakage past the working pistons. Great trouble has been experienced in preventing the lubrication from being carried out of the crank and gear chambers by the current of air through this vent to the atmosphere. This loss of lubrication is not only detrimental to the machine but it is objectionable to the workman whose person and clothing are thereby soiled.

I provide a vent to the atmosphere through the hollow crank pins of the crank shaft and utilize the centrifugal force occasioned by the rapid rotation of the crank shaft to separate the lubricant suspended in the air current passing through this vent and to force it through radial apertures into the crank pin bearings. Heating of the crank pins is not only prevented by the lubrication but a cooling action actually occurs due to radiation of heat to the current of air passing through the hollow crank pins. Fluid actuated rotary tools of this type are used in numerous places, in which compactness is a desirable feature and another object of the invention is to construct the machine in as small a compass as possible, compatible with the required amount of power.

It is also desirable that in such machines, the feeding mechanism for feeding the tool forward as it rotates, should be strong and readily and conveniently operated and permit a considerable length of feed without unnecessary overall length of tool and a further object is to improve upon the construction of the feeding mechanism.

Further objects of the invention will hereinafter appear and to all of these ends the invention is shown in one of its preferred forms in the accompanying drawings, in which—

Figure 1 is a side elevation partly broken away and partly in longitudinal section of the machine embodying the invention, Figure 2 is a side elevation of the machine, Figure 3 is a transverse sectional view on the line 3—3 of Figure 1 looking in the direction of the arrows, Figure 4 is a side elevation partly in longitudinal section of a modified form of the crank shaft, Figure 5 is a transverse sectional view of Figure 4 on the line 5—5 looking in the direction of the arrows, Figure 6 is a detail sectional elevation of the crank shaft shown in Figure 1, Figure 7 is a transverse sectional elevation of Figure 6 on the line 7—7 looking in the direction of the arrows, and Figure 8 is a longitudinal sectional elevation of a modified form of the crank shaft.

Referring to the drawings, the case or cylinder casing A, having the removable crank cover B, and the removable gear case or front head C forms the frame of the machine enclosing and supporting the operating parts for imparting rotation to a suitable tool, which may be carried in the socket D provided in the drill spindle E. The frame is provided with the handles F and G, one of which as the handle F constitutes the inlet of the machine, to which motive fluid is supplied and controlled in any suitable manner, by a valve on the handle, the details of which are not shown, as they form no part of the present invention.

The crank shaft H is mounted at one end and intermediate the crank and one end in the ball bearings J in the case A beneath the crank cover B and adapted to be operated by a fluid actuated motor of any suitable type, as for instance a multi-cylinder motor having opposed cylinders, two of the cylinders K being indicated in Figure 1 at one side of the machine, and at an angle to the axis, the remaining pair of cylinders L not being shown in Figure 1 but being indicated in Figures 2 and 3. The pistons O reciprocating in the cylinders are connected by the connected rods P to the crank shaft and the distribution of motive fluid to the cylinders, is in this instance, controlled by a rotary valve Q actuated by suitable gearing from the crank shaft. A passage Q' is formed in the casing for each cylinder and connects the port K' in the cylinder with the valve Q. The crank shaft is provided with a pinion R meshing with the gear S on the spindle E and another gear T connected to the gear S drives the valve Q through the agency of the pinion U, so that in the present instance the valve is rotated at half the speed of the crank shaft H.

The crank shaft shown in Figures 1 and 6, comprises the center web V in which the hollow crank pins W are located and aligned as by means of the suitable pins X. The shaft portion or end Y is integral with the end web Z but in this instance the shaft end or pinion $a$ is separate from the web $b$ of the crank shaft, but inserted therein. The crank pins W are provide with radial apertures $c$ registering with the apertures $d$ in the bearing sleeves $e$ on the crank pins. The crank pins are also provided with the radial apertures $f$. The center web V of the crank shaft is slotted centrally at $g$ and a bolt $h$ passing through the two portions of the web V clamps the parts tightly upon the crank pins. The hollow bores of the crank pins W communicate with the hollow bores of the shaft ends Y and $a$, by means of the passages $j$ formed in the end webs Z and $b$ of the crank shaft.

The passages formed through the crank shaft communicate at one end with the interior of the crank chamber within the cover B and at the other end communicate with the atmosphere outside the frame of the machine. By means of such construction, the centrifugal force occasioned by the rapid rotation of the crank shaft separates the lubricant suspended in the air current passing through the passages in the crank shaft which form a vent to atmosphere and forces the lubricant through the radial apertures $c$ and $f$ into the crank pin bearings. The end webs Z and $b$ of the crank may be provided with the counter balance weights, $k$ and the front end of the shaft portion $a$ extending through the front head C may be provided with a gland $o$. A cap $p$ may be provided over the other end of the crank shaft and this cap is formed with a vent $q$ in Figure 4.

The cylinders K and L are securely held within the case of the machine, and as shown, the cylinders are provided with the external rings or flanges $r$ bearing against the internal shoulders $s$ within the case. The outer ends of the bores of the cylinders are screw threaded at $t$ to receive the externally screw threaded and flanged lugs or heads $u$ which fit the cylinders and draw them tightly into the case when the heads are screwed into position, so that the ports K' and passages Q' may be maintained in alignment.

In order to feed the working tool forward an internal feed screw $v$ is mounted in the case and is provided with an extension 6 upon which is mounted a bearing 5 adapted to take either or both radial and thrust loads. Thrust of the working tool carried in the socket D is transmitted by the spindle E and the spindle gear S, in which the spindle E is rigidly mounted and keyed, and thence to the outer race of bearing 5 which is also mounted in the spindle gear S. The thrust is thence transmitted through the balls or rollers to the stationary inner race of bearing 5 and thence to the shoulder $w$ of the feed screw sleeve $v$ and thence by means of the screw threads to the feed screw $z$ and finally to the feed screw center 3 which is held in position by the socket 4.

A bearing adapted to take both radial and thrust loads and a working spindle on the feed screw as described permits of a greater length of feed without a telescopic construction and its consequent multiplication of parts and weakness of construction, and is obtained in a given shorter overall length.

The ejecting pin 7 as shown is for the purpose of ejecting the working tool from the socket D by screwing the feed screw $z$ down against it.

In Figures 4 and 5, a modified form of crank shaft is shown, in which a curved groove 8 is formed in the end web $b'$, the other end being vented to atmosphere. Said groove continues through the counter weight $k$ having an opening 9 at the exterior surface of the counter weight, so that as the crank shaft rotates the lubricant is scooped up and collected and carried back through the groove 8 to the center of rotation and thence by centrifugal force to the crank pin bearings. Otherwise the construction is substantially like that indicated in Figure 1.

Figures 6 and 7 are detail views of the crank shaft shown in Figure 1, and need not be further described. Figure 8 is a view of a modification in which the passage 10 in one crank pin W terminates at the point 11 at the periphery of the end web $Z^2$, and the said web $Z^2$ and the shaft end Y' are preferably solid. In Figure 8 the center web V' is provided with a passage 12 connecting the passage 10 of one crank pin W with the bore 13 of the other crank pin. The end web $b$ is provided with the passage $j$ connecting the hollow bore 13 with the hollow bore of the shaft end $a$, so that a continuous passage is formed through the crank shaft from the point 11 on the end web Z² to the opposite end of the crank shaft, which extends beyond the front head C.

I claim:

1. In a fluid actuated rotary tool, the combination of a casing, a crank cover and a crank shaft within the crank cover adapted to be actuated by a fluid operated reciprocating motor within the casing, a portion of said crank shaft being formed with a passage communicating with the atmosphere, whereby fluid tending to accumulate in the casing during the operation of the tool is permitted to escape from the crank chamber to atmosphere through said passage in the crank shaft.

2. In a fluid actuated rotary tool, the combination of a casing and a crank cover, a crank shaft within the crank cover adapted to be actuated by a fluid operated reciprocating motor within the casing, said crank shaft having hollow crank pins communicating through the crank shaft directly with the atmosphere and radial apertures in the crank pins, whereby an air current is caused to pass through said crank pins to atmosphere and the centrifugal force occasioned by the rapid rotation of the crank shaft separates the lubricant suspended in the air current and forces lubricant to the crank pins.

3. In a fluid actuated rotary tool, the combination of a casing and a crank cover, a crank shaft within the crank cover, adapted to be actuated by a fluid operated reciprocating motor within the casing, said crank shaft having hollow shaft portions open to atmosphere at one end and hollow crank pins open within the crank cover at one end, said hollow shaft portions and pins being connected by intermediate passages, and radial apertures in the crank pins, whereby the pressure created within the crank cover causes a flow of fluid through the hollow portions of the crank shaft capable of carrying lubricating material.

4. In a fluid actuated rotary tool, the combination of a casing and crank cover, a plurality of opposed cylinders in the casing, pistons in said cylinders, a crank shaft and crank within the crank cover connected to be actuated by said pistons, bearings for each end of said crank shaft, a bearing intermediate the crank and one end of the crank shaft, said crank shaft having hollow crank pins communicating directly with the atmosphere through the crank shaft, and radial apertures in the crank pins, whereby an air current is caused to pass through said crank pins to atmosphere and the centrifugal force occasioned by the rapid rotation of the crank shaft separates the lubricant suspended in the said air current and forces lubricant to the crank pins.

In testimony whereof I have signed this specification.

FRANCIS A. JIMERSON.